US012314614B2

(12) United States Patent
Yano

(10) Patent No.: US 12,314,614 B2
(45) **Date of Patent: *May 27, 2025**

(54) INFORMATION PROCESSING APPARATUS, INFORMATION PROCESSING METHOD, PROGRAM, AND RECORDING MEDIUM

(71) Applicant: FUJIFILM Corporation, Tokyo (JP)

(72) Inventor: Hironori Yano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,452

(22) Filed: Apr. 29, 2024

(65) Prior Publication Data

US 2024/0281175 A1 Aug. 22, 2024

Related U.S. Application Data

(63) Continuation of application No. 18/173,234, filed on Feb. 23, 2023, now Pat. No. 12,001,729.

(30) Foreign Application Priority Data

Mar. 23, 2022 (JP) ................................ 2022-046744

(51) Int. Cl.
*G06F 3/12* (2006.01)

(52) U.S. Cl.
CPC .......... *G06F 3/1204* (2013.01); *G06F 3/1207* (2013.01); *G06F 3/1268* (2013.01); *G06F 3/1273* (2013.01); *G06F 3/1288* (2013.01)

(58) Field of Classification Search
CPC .... G06F 3/1204; G06F 3/1207; G06F 3/1268; G06F 3/1273; G06F 3/1288

(Continued)

(56) References Cited

U.S. PATENT DOCUMENTS 6,763,148 B1 * 7/2004 Sternberg ............... G06V 20/00 707/E17.02
7,609,914 B2 * 10/2009 Hirai .................. G06F 16/5854 707/999.107

(Continued)

FOREIGN PATENT DOCUMENTS

JP 2019-192016 A 10/2019

*Primary Examiner* — Negussie Worku
(74) *Attorney, Agent, or Firm* — Studebaker Brackett PLLC

(57) ABSTRACT

Useful information on image transmission is provided to a user who transmits an image in a network print technology. Features of transmitted images from a first user are specified for the transmitted images, a correspondence relationship between the feature of the transmitted image and an implementation history of image printing on a second user side is specified for each second user, a value related to an implementation frequency of the image printing is calculated for each second user and for each feature based on the correspondence relationship specified for each second user, a first image is specified among the transmitted images for each second user, two or more second users who have the feature of the first image in common are extracted, a second image having a feature of an image that is not transmitted to a target user among the extracted two or more second users and having a feature of a transmitted image that has been printed by a non-target user other than the target user is specified, and the second image is notified to the first user that has transmitted the transmitted image to the target user.

23 Claims, 9 Drawing Sheets

(58) Field of Classification Search
USPC .......................................................... 358/11.5
See application file for complete search history.

(56) References Cited

U.S. PATENT DOCUMENTS

| | | | | |
|---|---|---|---|---|
| 11,172,082 | B2 * | 11/2021 | Yoshimi | G06F 3/1258 |
| 11,514,600 | B2 * | 11/2022 | Wakita | G06F 16/7837 |
| 11,632,479 | B2 * | 4/2023 | Mori | H04N 1/0097<br>358/1.13 |
| 11,947,854 | B2 * | 4/2024 | Yamaji | G06F 3/1205 |
| 12,001,729 | B2 * | 6/2024 | Yano | G06F 3/1273 |
| 12,020,462 | B2 * | 6/2024 | Kobayashi | G06V 30/416 |
| 2004/0161257 | A1 * | 8/2004 | Ishihara | G06K 15/00<br>399/81 |
| 2007/0201767 | A1 | 8/2007 | Fujita | |
| 2011/0025873 | A1 | 2/2011 | Wang et al. | |
| 2017/0060505 | A1 | 3/2017 | Tamashima | |
| 2017/0242636 | A1 | 8/2017 | Minami | |
| 2017/0272584 | A1 * | 9/2017 | Tatsuma | H04N 1/21 |
| 2019/0220232 | A1 | 7/2019 | Nagai | |
| 2019/0361650 | A1 * | 11/2019 | Ren | G06F 3/1204 |
| 2020/0089453 | A1 | 3/2020 | Tsuda et al. | |
| 2022/0261199 | A1 | 8/2022 | Yano | |
| 2023/0153049 | A1 | 5/2023 | Fukiage | |
| 2023/0244431 | A1 | 8/2023 | Yamaji | |

* cited by examiner

DISPLAY SCREEN OF FIRST USER SIDE
INBOX OF MR(S). ○○ HAS BEEN CREATED.
DO YOU WANT TO SEND IMAGE?
SEND
NOT SEND
IMAGE LIST
LI
TRANSMISSION
DISPLAY SCREEN OF SECOND USER SIDE
FOLLOWING IMAGE HAS RECEIVED FROM MR(S). △△
DO YOU WANT TO PRINT IMAGE?
PRINT
NOT PRINT
DURING PRINTING
FILM COMES OUT OF PRINTER.

IMAGE GROUP OF USER A
USER A
RECOMMENDATION (NOTIFICATION)
FEATURE COMMON GROUP
USER B
FREQUENTLY PRINTED IMAGE: IMAGE OF SEA
USER C
FREQUENTLY PRINTED IMAGE: IMAGE OF SEA
ANOTHER IMAGE FOR WHICH NUMBER OF TIMES OF PRINTING IS LARGE: IMAGE OF MOUNTAIN

FIG. 6

| IMAGE ID | FEATURE VALUE | TYPE OF SUBJECT | IMAGING DATE AND TIME /LOCATION |
|---|---|---|---|
| P00001 | FEATURE VALUE OF SUBJECT #1<br>FEATURE VALUE OF SUBJECT #2 | SUBJECT #1: MALE<br>SUBJECT #2: RECHARGEABLE PREPAID IC CARD<br>SCENE SUNSET | 2/15/2021 16:30<br>A TOWN |
| P00002 | FEATURE VALUE OF SUBJECT #3<br>FEATURE VALUE OF SUBJECT #4<br>FEATURE VALUE OF SUBJECT #5 | SUBJECT #3: FEMALE<br>SUBJECT #4: ICE CREAM<br>SUBJECT #5: FERRIS WHEEL<br>SCENE AMUSEMENT PARK | 1/10/2022 10:00<br>B TOWN |
| ⋮ | ⋮ | ⋮ | ⋮ |

FIG. 7

| TRANSMISSION ID | ID OF FIRST USER | ID OF SECOND USER | IMAGE ID | PRINTING IMPLEMENTATION | NUMBER OF TIMES OF PRINTING |
|---|---|---|---|---|---|
| 1 | U0001A | U0002B | P0001 | PRESENCE | 3 |
| 2 | U0003A | U0004B | P0002 | ABSENCE | 0 |
| • • • | • • • | • • • | • • • | • • • | • • • |

FIG. 8

| ID OF SECOND USER | TYPE OF SUBJECT (FEATURE) | NUMBER OF TIMES OF PRINTING |
| --- | --- | --- |
| U0002B | SEA | 10 |
| | MOUNTAIN | 8 |
| | AMUSEMENT PARK | 4 |

FIG. 9

PRINTING IMPLEMENTATION HISTORY OF USER B

| TYPE OF SUBJECT (FEATURE) | NUMBER OF TIMES OF PRINTING |
| --- | --- |
| SEA | 10 |
| TEMPLE | 8 |
| SCHOOL | 4 |

PRINTING IMPLEMENTATION HISTORY OF USER C

| TYPE OF SUBJECT (FEATURE) | NUMBER OF TIMES OF PRINTING |
| --- | --- |
| SEA | 10 |
| MOUNTAIN | 8 |
| RIVER | 4 |

INFORMATION PROCESSING APPARATUS, INFORMATION PROCESSING METHOD, PROGRAM, AND RECORDING MEDIUM

CROSS-REFERENCE TO RELATED APPLICATIONS

The present application is a Continuation of U.S. patent application Ser. No. 18/173,234 filed Feb. 23, 2023, which claims priority under 35 U.S.C. § 119 to Japanese Patent Application No. 2022-046744, filed on Mar. 23, 2022. The above application is hereby expressly incorporated by reference, in its entirety, into the present application.

BACKGROUND OF THE INVENTION

1. Field of the Invention

The present invention relates to an information processing apparatus, an information processing method, a program, and a recording medium for implementing printing of a transmitted image from a user on another user side.

2. Description of the Related Art

In recent years, with the spread of a network communication technology, images can be sent between users. A technology for printing an image provided by a user via a network on another user side, that is, a network printing technology has already been developed (see, for example, JP2019-192016A).

SUMMARY OF THE INVENTION

In the network printing technology described in JP2019-192016A, in a case where an image having a high possibility that a user of an image transmission destination likes can be transmitted, it is expected that a satisfaction level of the user is enhanced. In a case where a user of an image transmission source can easily find the above-mentioned image, a burden of selecting the transmitted image can be reduced.

The present invention has been made in view of the above-described circumstances, and specifically, an object thereof is to provide an information processing apparatus, an information processing method, a program, and a recording medium capable of providing useful information on a transmitted image to a user that transmits an image in a network printing technology.

In order to achieve the above-described object, an information processing apparatus according to an embodiment of the present invention is an information processing apparatus comprising a processor and implementing printing of transmitted images from a first user on a second user side. The processor is configured to specify a feature of the transmitted image for each transmitted image, specify a correspondence relationship between the feature of the transmitted image and an implementation history of the printing of the transmitted image on the second user side for each second user, calculate a value related to an implementation frequency of the printing of the transmitted image based on the correspondence relationship specified for each second user for each second user and for each feature, specify a first image having the feature determined depending on a magnitude of the value among the transmitted images for each second user, extract two or more second users who have the feature of the first image in common, specify a second image having the feature of an image that is not transmitted to a target user among the extracted two or more second users and having the feature of the transmitted image that has been printed by a non-target user other than the target user among the two or more second users, and notify the first user that has transmitted the transmitted image to the target user of the second image.

The processor may be configured to specify the feature for each of image groups that are able to be transmitted by the first user that has transmitted the transmitted image to the target user, and specify the second image from the image group based on the feature of each of the image groups.

The processor may be configured to specify, as the feature, at least one of a feature value of a subject in the transmitted image, information on a type of the subject, information on an imaging date and time of the transmitted image, or information on an imaging location of the transmitted image.

The processor may be configured to specify the feature by analyzing a region of the transmitted image in which there is the subject.

The processor may be configured to specify the feature based on additional information added to the transmitted image.

The processor may be configured to preferentially notify of the second image having the feature that the number of times of printing by the non-target user is larger among a plurality of the second images in a case where the plurality of second images are specified.

The processor may be configured to specify the correspondence relationship in association with the first user that has transmitted the transmitted image to the second user.

The processor may be configured to specify the first image having the feature in which the value is largest among the transmitted images for each second user.

In a case where the transmitted image is printed on the second user side, the processor may be configured to acquire print information on the printed transmitted image and specify the correspondence relationship based on the print information.

In order to solve the above-described problems, an information processing method according to an embodiment of the present invention is an information processing method for implementing printing of transmitted images from a first user on a second user side. The method comprises, by a processor, specifying a feature of the transmitted image for each transmitted image, specifying a correspondence relationship between the feature of the transmitted image and an implementation history of the printing of the transmitted image on the second user side for each second user, calculating a value related to an implementation frequency of the printing of the transmitted image based on the correspondence relationship specified for each second user for each second user and for each feature, specifying a first image having the feature determined depending on a magnitude of the value among the transmitted images for each second user, extracting two or more second users who have the feature of the first image in common, specifying a second image having the feature of an image that is not transmitted to a target user among the extracted two or more second users and having the feature of the transmitted image that has been printed by a non-target user other than the target user among the two or more second users, and notifying the first user that has transmitted the transmitted image to the target user of the second image.

The above-described information processing method may further comprise specifying, by the processor, the feature for each of image groups that are able to be transmitted by the first user that has transmitted the transmitted image to the target user, and specifying the second image from the image group based on the feature of each of the image groups.

The above-described information processing method may further comprise preferentially notifying, by the processor, the second image having the feature that the number of times of printing by the non-target user is larger among a plurality of the second images in a case where the plurality of second images are specified.

The above-described information processing method may further comprise specifying, by the processor, the correspondence relationship in association with the first user that has transmitted the transmitted image to the second user.

The above-described information processing method may further comprise acquiring, by the processor, print information on the printed transmitted image, and specify the correspondence relationship based on the print information in a case where the transmitted image is printed on the second user side.

According to the present invention, it is possible to realize a program causing a computer to execute each step included in the above-described information processing method. According to the present invention, it is possible to realize a recording medium readable by a computer having a program recorded thereon causing a computer to execute each step included in the above-described information processing method.

According to the present invention, the information processing apparatus, the information processing method, the program, and the recording medium capable of providing the useful information on the transmitted image to the user who transmits the image in the network print technology are realized.

BRIEF DESCRIPTION OF THE DRAWINGS

FIG. 6 is a diagram showing an example of an analysis result of an image.

FIG. 7 is a diagram showing an example of an implementation history of printing.

FIG. 8 is a diagram showing an example of a calculation result of a printing implementation frequency of an image.

FIG. 9 is an explanatory diagram of a procedure for specifying a feature common group.

DESCRIPTION OF THE PREFERRED EMBODIMENTS

One specific embodiment of the present invention will be described with reference to the drawings. However, the embodiment to be described below is merely an example for facilitating the understanding of the present invention and does not limit the present invention.

The present invention may be modified or improved from the following embodiments without departing from the spirit of the present invention. The present invention includes an equivalent thereof.

In the present specification, the concept of "apparatus" includes a single apparatus that exhibits a specific function as a single apparatus, and includes a plurality of apparatuses that are present independently of each other in a distributed manner and exhibit a specific function in cooperation (collaboration) with each other.

In the present specification, an "image" is defined as image data unless otherwise specified. Examples of the image data include lossy compression image data such as a Joint Photographic Experts Group (JPEG) format, and lossless compression image data such as a Graphics Interchange Format (GIF) or Portable Network Graphics (PNG) format. The image data may include data indicating information such as a file name, an imaging date and time, and an imaging location.

In the present specification, a "user" is a user who uses an information processing apparatus according to the embodiment of the present invention. Using the information processing apparatus means that a function of the information processing apparatus is used, and the function of the information processing apparatus is used from another apparatus (for example, a user terminal) in addition to directly operating the information processing apparatus.

About Configuration of Image Printing System

Figure 1:
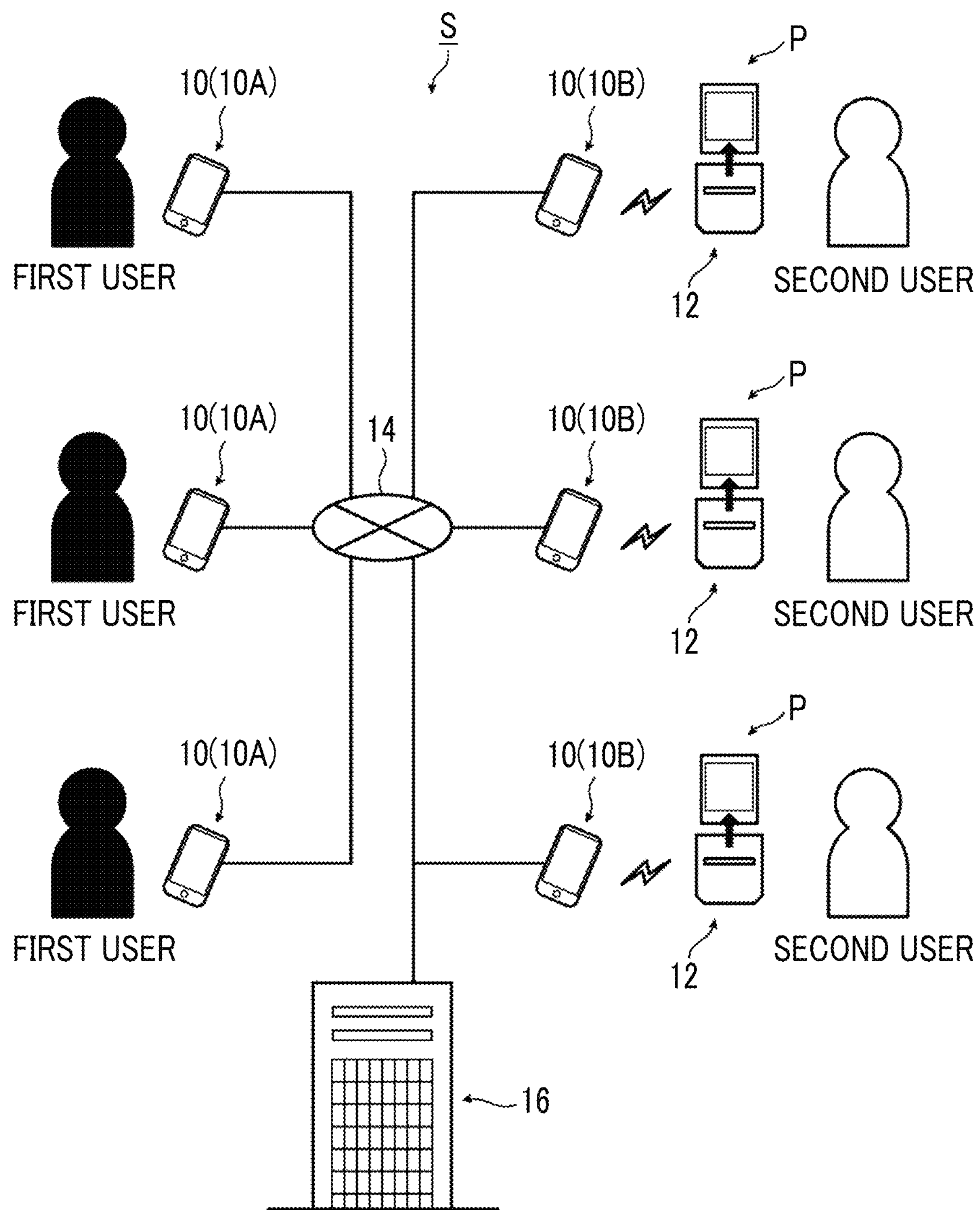
FIG. 1 is a diagram showing a configuration of an image printing system.

The present invention is an information processing technology related to transmission and reception of an image, printing, and the like, and is specifically applied to an image printing system S shown in FIG. 1. The image printing system S is a system for network printing and includes an information processing apparatus according to the embodiment of the present invention.

In the information processing apparatus according to the embodiment of the present invention, an image is transmitted from a certain user (hereinafter, first user) to another user (hereinafter, second user) via a network, and causes the second user side who receives the image to implement the printing of the image. Here, in the present specification, "causing the second user side to implement the printing of the image" does not mean that the information processing apparatus directly instructs the second user to print, but means that the second user side can implement the printing of the image by transmitting and receiving images of the information processing apparatus.

"Sending an image from a first user" is synonymous with transmitting an image from a device used by the first user. "Sending an image to a second user" is synonymous with transmitting an image to a device used by the second user. Examples of the device used by the user include user terminals 10 to be described below, and may include devices that can be used by logging in by inputting account information or a password of a device not owned by the user, such as a terminal installed in a store or the like.

"Printing an image on the second user side" means that the image is printed by a printer that can be used by the second user.

The first user and the second user are relative concepts (positions), and a user who was the first user at immediately before a timing of moment may be the second user immediately before a timing of moment. That is, each user is the first user in a case where an image is transmitted and the second user in a case where an image is received.

As shown in FIG. 1, the image printing system S includes the user terminals 10 used by the users, printers 12 used by second users, and a server computer 16. The server computer 16 and the user terminals 10 of the users are connected to each other so as to be able communicate via a network 14 such as the Internet and a mobile network.

In FIG. 1, for the sake of convenience in illustration, the number of first users and the number of second users are set to three, but the number of first users and the number of second users are not particularly limited.

The user terminal 10 is a computer used by the user, and specifically, is a smartphone, a tablet terminal, a notebook personal computer (PC), or the like. The user terminal 10 includes a processor, a memory, and a communication interface.

The user terminal 10 stores an application program (hereinafter, simply referred to as a terminal-side program) for using an image printing service. The image printing service is a cloud service related to transmission and reception of an image, editing of an image, and printing of an image. Each user can transmit or receive an image via a network or implement the printing of an image by using the image printing service through a terminal-side program.

In a case where a camera is mounted on the user terminal 10 of the first user, the first user can capture an image by the camera. The first user can take an image captured by an imaging device such as a digital camera in the user terminal 10 by connecting the imaging device to the user terminal 10. As described above, the first user can acquire an image group including two or more images by acquiring an image and increasing the number of times the image is acquired.

The image group acquired by the first user (hereinafter, the image group of the first user) corresponds to an image group that can be transmitted (provided) by the first user. That is, the first user selects one or more images from the image group, and the user terminal 10 transmits the selected one or more images and specifically uploads the selected image to the server computer 16.

As long as each image of the image group of the first user can be transmitted to the second user in accordance with an intention of the first user, a storage destination thereof is not particularly limited. That is, each image of the image group of the first user does not need to be stored in the user terminal 10 of the first user, and a part or all of the image groups of the first user may be accumulated in a device connected to the user terminal 10 via the network, for example, the server computer 16.

The printer 12 is a device used by the second user to print the transmitted image from the first user. The printer 12 is connected to the user terminal 10 by Wi-Fi (registered trademark) or Bluetooth (registered trademark) in a wireless manner, or is connected to the user terminal 10 in a wired manner.

The printer 12 is controlled by the user terminal 10 based on an operation of the second user, and can print the images received by the user terminal 10. Specifically, in a case where the second user designates an image as a printing target from among the images received by the user terminal 10 through the user terminal 10, the user terminal 10 controls the printer 12 in accordance with the designation operation. Under such control, the printer 12 prints the image designated by the user.

The printing method of the image by the printer 12 is, for example, an instant photographic method. Specifically, a photosensitive film accommodated in the printer 12 is exposed to form a latent image, and a developer in a developer pot provided at an end part of the film is developed on a film surface. Thus, an image in which the latent image is visualized is formed. However, the printing method is not limited to the instant photographic method, and may be an inkjet method, a sublimation-type thermal transfer method, an electrophotographic method using a toner, or the like.

The printer 12 may be a device dedicated to the user, a home-use printer installed in the user's home, or a store-installed printing device that can be used in a case where the user visits a store or the like.

The server computer 16 is a computer that provides a platform for an image printing service that is a cloud service, and constitutes the information processing apparatus according to the embodiment of the present invention. Specifically, the server computer 16 relays the transmission and reception of the image between the users, and also executes processing related to the printing of the image on the second user side.

The server computer 16 stores information on a user who uses the image printing service for each user. This information includes a transmission and reception history of the image of the user and an implementation history of the image printing of the user. These pieces of history information may be stored in the user terminal 10 or the printer 12 of each user. In this case, the server computer 16 may acquire the information stored in the user terminal 10 by communicating with the user terminal 10.

The server computer 16 has a function of analyzing each image in the image group of the first user and an image printed by the second user. The server computer 16 has a function of notifying (recommending) the first user of useful information on the image transmission based on the analysis result.

The function can be executed by an application programming interface (API) mounted on the server computer 16. The first user can confirm recommendation information by the server computer 16 by using the API.

The notification (recommendation) of the information to the first user means that the information is transmitted to the device (for example, the user terminal 10) that can be used by the first user and the information is output by the device. The method for outputting the information is not particularly limited, and for example, the information may be displayed on a screen of a display, or a voice corresponding to the information may be reproduced and emitted from a speaker or the like.

Transmission and Reception of Image and Printing of Image

Next, the transmission and reception of the image between the users and the printing of the image performed through the image printing service will be described with reference to FIG. 2. The following description is mainly performed in terms of a graphical user interface (GUI) displayed on a screen of the user terminal 10.

Contents to be described below are not limited to a case where the transmission and reception of the image are performed between two users, and also in a case where one first user performs the transmission and reception of the image to and from a plurality of second users.

Both the first user and the second user download the terminal-side program and install the program on the user terminal 10 in a case where the image printing service is used. In order to obtain the terminal-side program, each of the first user and the second user may perform an input operation for account registration, such as a name, an age, and a gender. In this case, the input information is stored in, for example, the server computer 16.

Figure 2:
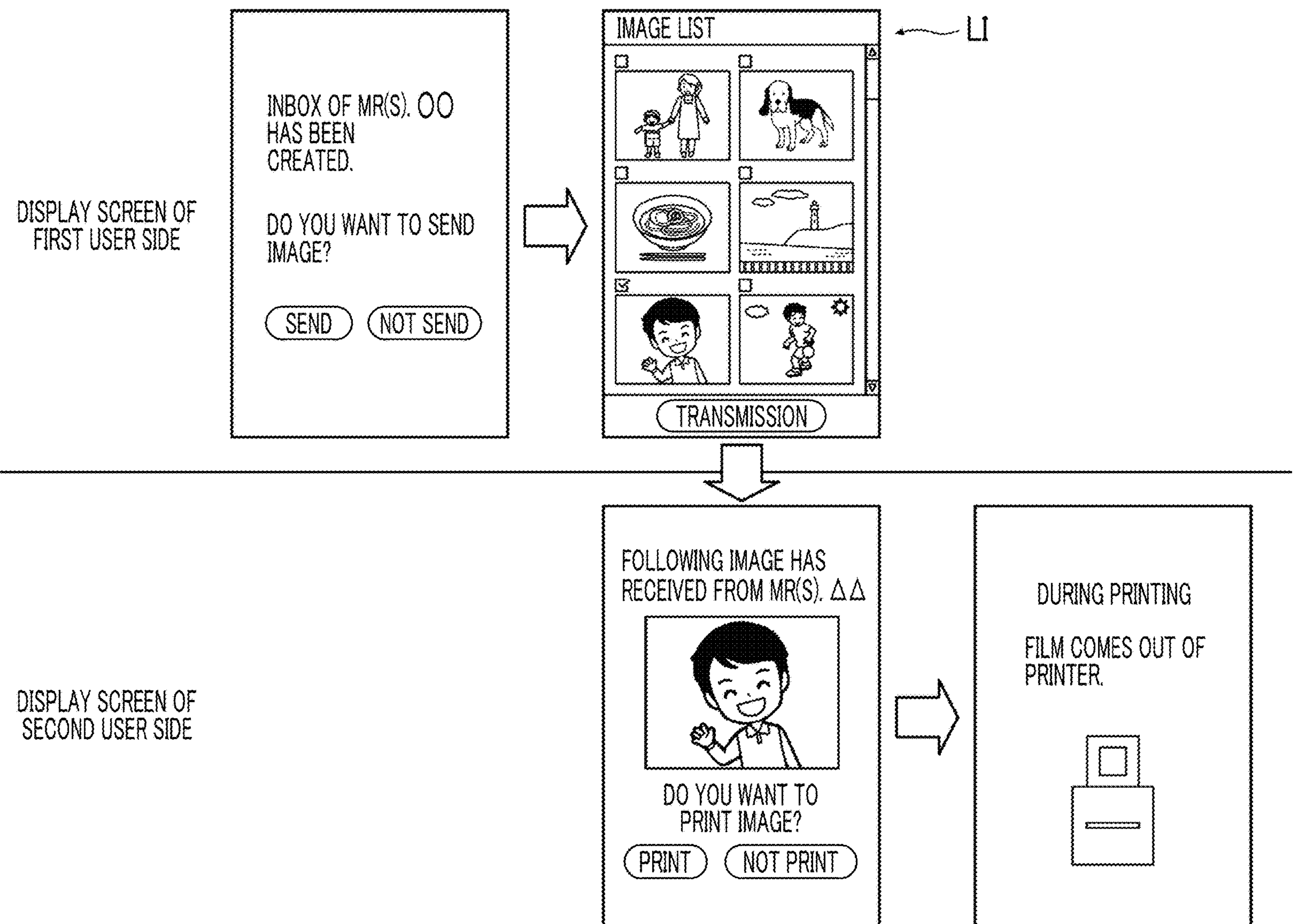
FIG. 2 is a diagram showing a procedure of image printing.

Thereafter, in a case where the second user starts the terminal-side program to create a folder for receiving the image (hereinafter, referred to as an inbox for the sake of convenience), the information is notified to the first user as shown in FIG. 2. In this case, a notification unit is not particularly limited, and for example, mail transmission or message posting via a social networking service (SNS) collaborated with the image printing service may be used.

In a case where a predetermined operation is performed after the first user starts the terminal-side program, a list LI of image groups of the first user is displayed on the user terminal 10 of the first user as shown in FIG. 2. The first user selects an image to be transmitted to the second user from the list LI, and performs an operation for image transmission (for example, an operation of pressing a transmission button). Accordingly, the image selected by the first user is transmitted from the user terminal 10 of the first user. The transmitted image is once received by the server computer 16 and is transmitted from the server computer 16 to the user terminal 10 of the second user.

In a case where the image sent from the first user through the server computer 16 (hereinafter, received image) is received, the user terminal 10 of the second user stores the received image in the inbox and notifies the second user of information indicating that the image is received. The second user confirms the received image stored in the inbox through the screen of the user terminal 10, and performs an operation of requesting printing of the received image in a case where the second user wishes to print the received image (for example, an operation of pressing a printing button). Accordingly, an image as a printing target and a printing command are sent from the user terminal 10 of the second user to the printer 12.

The printer 12 prints the image designated as the printing target by the second user according to the printing command. Accordingly, the second user can print the received image (in other words, the transmitted image from the first user) and can acquire a printed matter P. In a case where the image printing is implemented on the second user side, print information on the printed image (that is, the transmitted image from the first user) is transmitted from the user terminal 10 of the second user to the server computer 16.

About Image Recommendation

Figure 3:
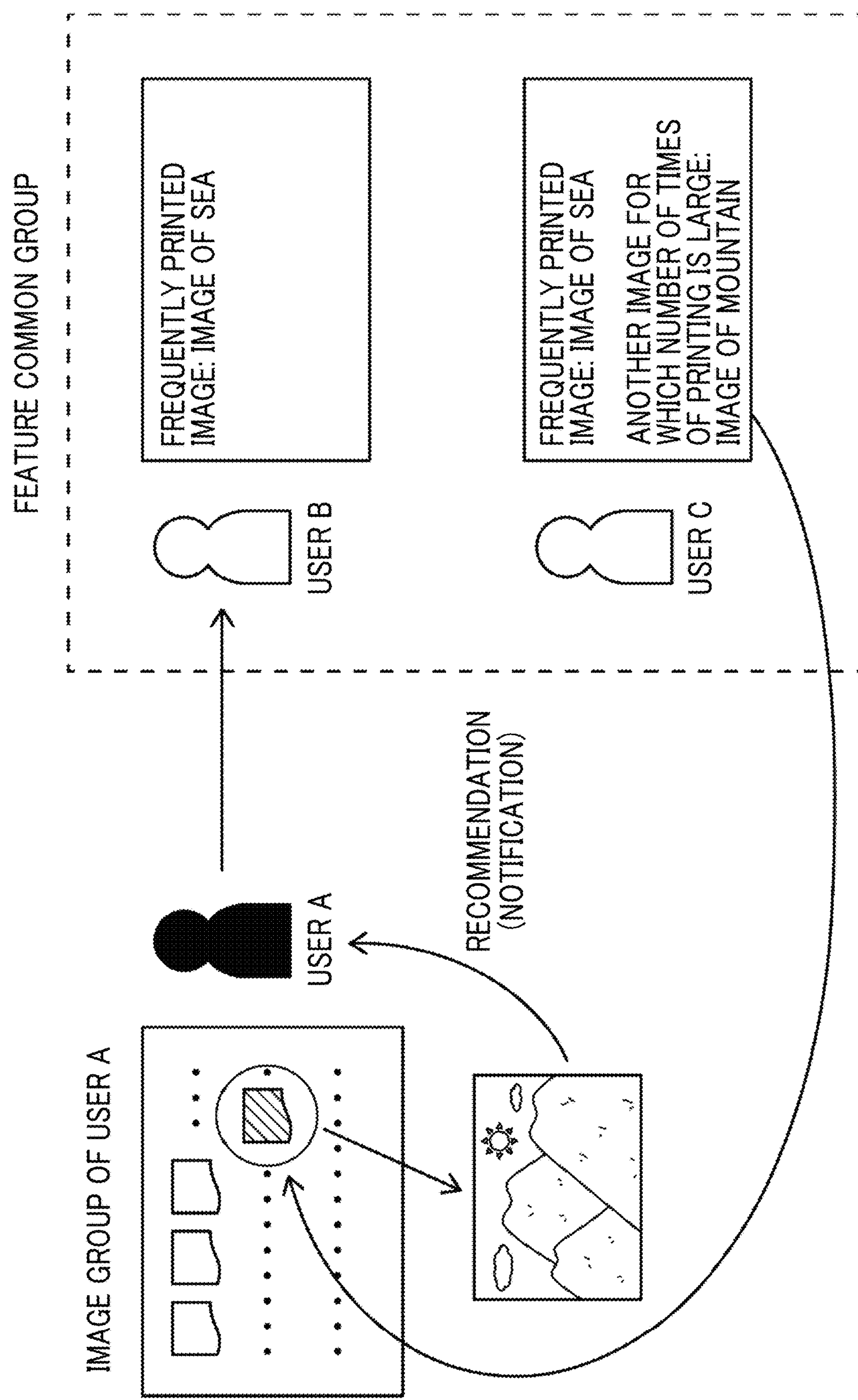
FIG. 3 is an explanatory diagram for image recommendation.

Next, the image recommendation by the server computer 16 will be described with reference to FIG. 3. Hereinafter, the description will be made on the assumption that a user A is the first user who transmits images, users B and C are the second users who receive images, and the user A may have transmitted an image to the user B in the past.

For example, in a case where the user A transmits the image to the user B, the server computer 16 can specify an image suitable as the transmitted image to the user B from the image group of the user A, and can notify (recommend) the user A of the specified image.

Specifically, the server computer 16 specifies a feature of the image that has been printed by the user B so far. A feature value of a subject in the image, information on a type of the subject, information on an imaging date and time of the image, information on an imaging location, and the like correspond to the feature of the image, and the server computer 16 specifies at least one of these features.

The subject means a person, an object, and a background appearing in the image. In the present specification, the concept of the subject may also include a landscape (for example, sea, mountain, or the like) specified from the image, a scene (for example, dawn or dusk, a clear sky, or the like), and a theme (for example, travel, meal, or events such as athletic meet).

The feature value of the subject in the image is generated by, for example, a resolution of the subject in the image, a data amount, a degree of blurring, a size ratio to an angle of view, a position at the angle of view, a tint, or a combination of a plurality of these feature values. The feature value may be specified by applying a known image analysis technology and analyzing a region of the image in which there is the subject.

The feature value may be a value output by inputting an image to a trained model constructed in advance by machine learning, or may be, for example, a one-dimensional or multidimensional vector value. Here, although the feature value output from the trained model may not be meaningfully interpreted by human, as long as the feature value is at least a value that is uniquely output in a case where one image is input, the value can be used as the feature value.

The information on the type of the subject is information representing a category (classification), a state, an aspect, an attribute of the subject, and other contents related to the type of the subject. The information on the type of the subject may be information indicating a theme of the image, a scene, or the like. In a case where the subject is a person, who is the subject may be specified from the feature value of the subject, and the specification result may be used as the information on the type of the subject.

The information on the type of the subject may be specified by applying a known subject recognition technology and analyzing the region in the image in which there is the subject. In a case where additional information (specifically, tag information or the like) indicating the type of the subject is added to the image, the information on the type of the subject may be specified based on the additional information.

The imaging date and time and the imaging location of the image can be specified based on the additional information, for example, tag information in an exchangeable image file format (EXIF) added to the image.

Returning to the description of the image recommendation, the server computer 16 specifies the feature of the image that has been printed even for the second user (for example, the user C) other than the user B. The server computer 16 specifies the feature of the most frequently printed image (hereinafter, first image) for each of the plurality of second users including the user B.

Hereinafter, the description will be made on the assumption that the feature of the first image specified for the user B, specifically, the information on the type of the subject is "sea" (see FIG. 3).

After the feature of the first image is specified, the server computer 16 extracts the second user who has the feature of the first image with the user B in common, that is, the second user who most frequently prints the image of "sea". Here, the user C is specified as the second user who has the feature of the first image with the user B in common. In this case, the users B and C correspond to two or more second users who have the feature of the first image in common, and are hereinafter also referred to as "feature common group".

The server computer 16 specifies the second image based on the implementation history of the image printing of the user C who is the user other than the user B in the feature common group. The second image is an image that has never transmitted to the user B by the user A, and is an image having a feature of an image for which the number of times of printing is large among images received by the user C in the past (that is, an image transmitted from any one of the first users to the user C). For example, taking a specific example, in a case where a feature of an image other than the image of "sea" and in which the number of times of printing by the user C is large is "mountain", the image of "mountain" corresponds to the second image.

Thereafter, the server computer 16 specifies the second image, that is, the image of "mountain" from the image group of the user A. The server computer 16 notifies (recommends) of the second image specified from the image group of the user A as the transmitted image to the user B.

According to the above procedure, an image having a possibility that the user B likes can be notified (recommended) to the user A. Specifically, the second image recommended as the transmitted image to the user B is an image having a feature of an image frequently printed by the user C belonging to the same feature common group as the user B. Here, it is presumed that the user C who belongs to the same feature common group as the user B is a user who has a high probability that interests, tastes, and the like are similar to or common to the user B. Thus, in a case where the image is an image that has not received by the user B so far and is an image frequently printed by the user C, it is expected that there is a high probability that the user B likes (satisfies) the image.

For the above reasons, the second image having the feature of the image frequently printed by the user C is notified (recommended) to the user A as an image suitable as the transmitted image to the user B. Accordingly, it is possible to reduce a burden on the user A who is an image transmission source to find an image that the user B which is an image transmission destination likes.

Configuration of Information Processing Apparatus According to Embodiment of Present Invention The information processing apparatus according to the embodiment of the present invention is the server computer 16 as described above. The number of computers constituting the information processing apparatus may be one or two or more. That is, the information processing apparatus according to the embodiment of the present invention is realized by a processor and a program on which the processor can be executed, and is, for example, a general-purpose computer.

Figure 4:
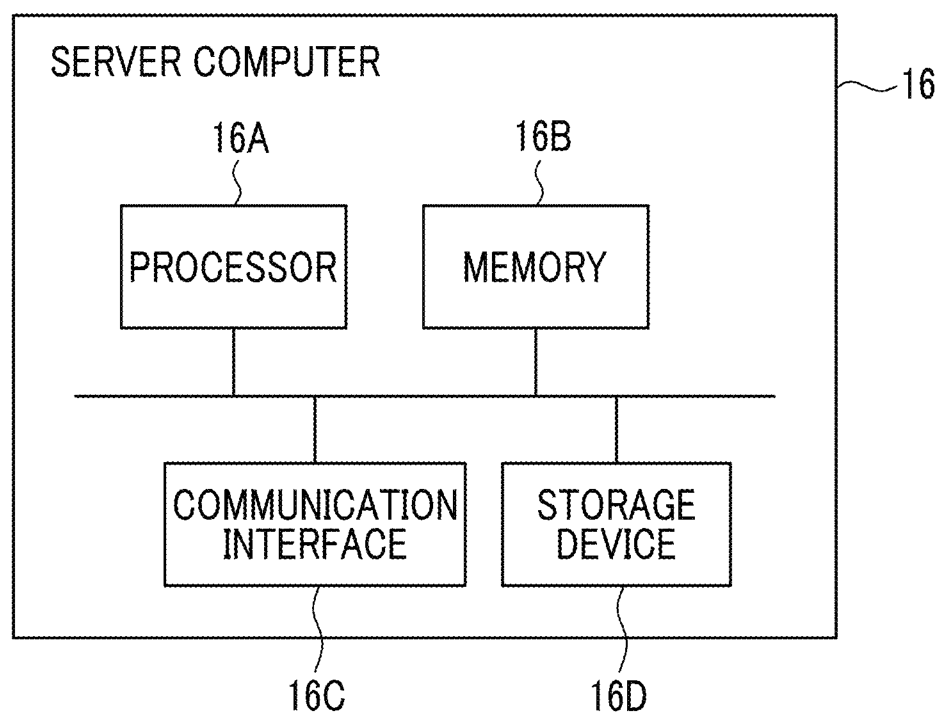
FIG. 4 is a diagram showing a hardware configuration of an information processing apparatus according to an embodiment of the present invention.

As shown in FIG. 4, the server computer 16 includes a processor 16A, a memory 16B, a communication interface 16C, a storage device 16D, and the like.

The processor 16A is, for example, a central processing unit (CPU), a graphics processing unit (GPU), a digital signal processor (DSP), a tensor processing unit (TPU), or the like.

The memory 16B is, for example, a semiconductor memory such as a read only memory (ROM) and a random access memory (RAM).

The communication interface 16C is, for example, a network interface card, a communication interface board, or the like.

The storage device 16D is, for example, storage built in or external to the server computer 16, a network attached storage (NAS), or the like. However, the present invention is not limited thereto, and the storage device 16D may be a third computer, for example, a so-called online storage capable of communicating with the server computer 16.

Various kinds of information necessary for the image printing service are stored in the storage device 16D. Images provided (transmitted) from the first user to the second user are stored in the storage device 16D. In the storage device 16D, a history in which the second user prints the transmitted image from the first user, that is, the implementation history of the image printing is stored for each second user.

A program (hereinafter, a server-side program) for causing the server computer to function as the information processing apparatus according to the embodiment of the present invention is installed in the server computer 16. The server-side program is a program for causing a computer to execute each step included in an information processing method according to the embodiment of the present invention. That is, the processor 16A reads out the server-side program and executes a series of processing related to the image printing service.

The server-side program may be acquired by being read from a recording medium readable by a computer, or may be acquired by being received (downloaded) through a communication line such as the Internet or an intranet.

Figure 5:
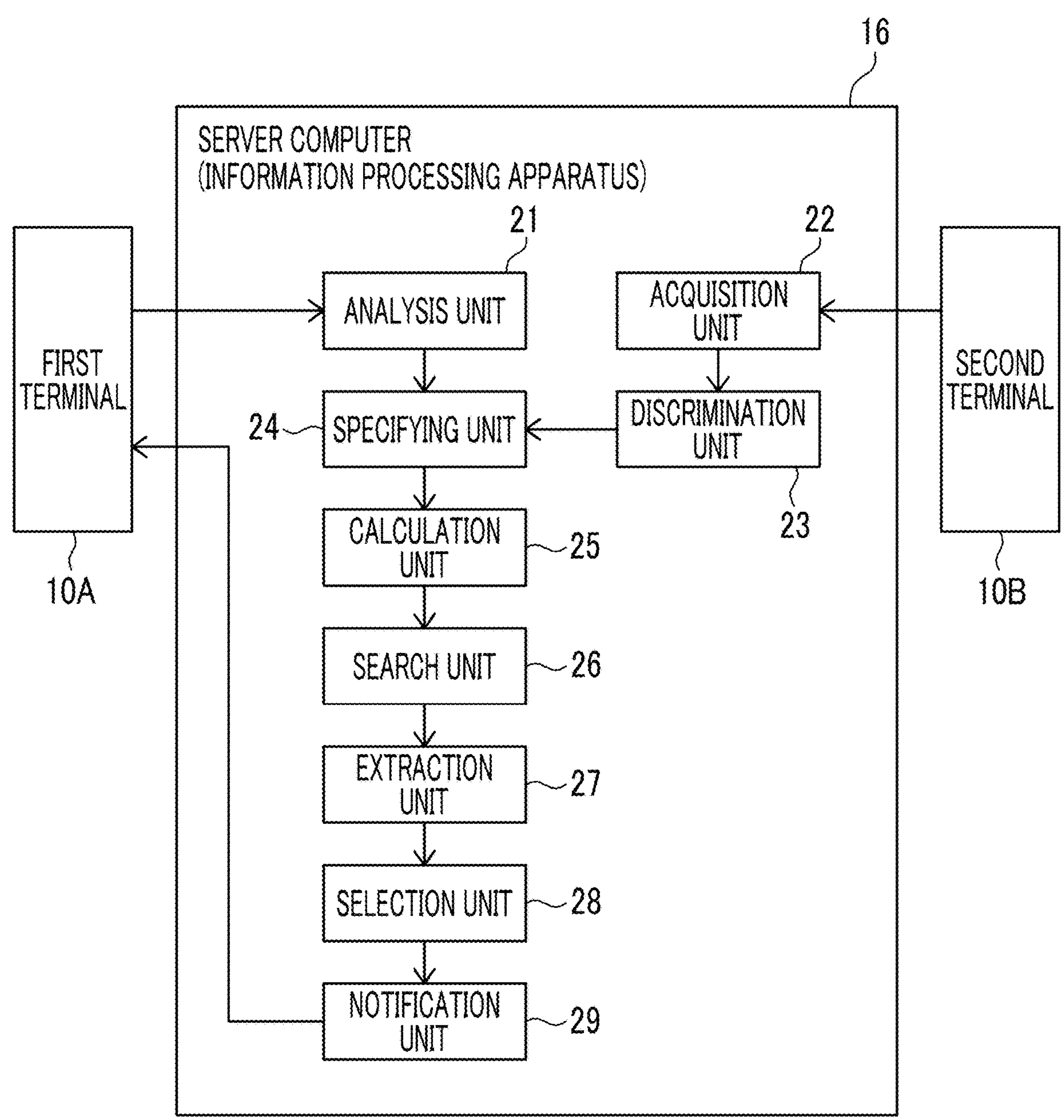
FIG. 5 is a diagram showing a function of the information processing apparatus according to the embodiment of the present invention.

A configuration of the server computer 16 constituting the information processing apparatus will be described again from a functional aspect. As shown in FIG. 5, the server computer 16 includes an analysis unit 21, an acquisition unit 22, a discrimination unit 23, a specifying unit 24, a calculation unit 25, a search unit 26, an extraction unit 27, a selection unit 28, and a notification unit 29. These functional units are realized by cooperation between a hardware device included in the server computer 16 and software including the server-side program.

Hereinafter, each functional unit will be described. In the following description, the user terminal 10 of the first user will be referred to as a "first terminal 10A", and the user terminal 10 of the second user will be referred to as a "second terminal 10B".

Analysis Unit

The analysis unit 21 analyzes the image received by the second user, in other words, the transmitted image from the first user (specifically, the first terminal 10A) for each transmitted image, and specifies the feature of the transmitted image for each transmitted image.

Specifically, the transmitted image from the first user is temporarily stored in the storage device 16D of the server computer 16. At this time, the analysis unit 21 analyzes the transmitted image stored in the storage device 16D. The transmitted image means an image transmitted by one first user to one second user. For example, in a case where the first user transmits the same image to the plurality of second users, the image received by each second user corresponds to a different transmitted image.

By analyzing the transmitted image, the analysis unit 21 specifies, as the feature, at least one of the feature value of the subject in the transmitted image, the information on the type of the subject, the information on the imaging date and time of the transmitted image, or the information on the imaging location of the transmitted image.

Specifically, in a case where the feature value of the subject is specified as the feature, the analysis unit 21 specifies the feature by analyzing the region of the transmitted image in which there is the subject.

In a case where the information on the type of the subject is specified as the feature, the analysis unit 21 specifies the feature by analyzing the region of the transmitted image in which there is the subject, or specifies the feature based on the additional information (tag information) added to the transmitted image.

In a case where the information on the imaging date and time of the transmitted image and the information on the imaging location of the transmitted image are specified as the feature, the analysis unit 21 specifies the feature based on the additional information (for example, tag information in the Exif format) added to the transmitted image.

The feature specified by the analysis unit 21 is stored in the storage device 16D in association with an identification ID (image ID) of the transmitted image having the feature. FIG. 6 shows an example of the analysis result of the transmitted image.

An image ID of each transmitted image is stored in the storage device 16D in association with the first user who transmits the image and the second user who receives the image.

Acquisition Unit

The acquisition unit 22 acquires print information on the printed transmitted image in a case where the transmitted image is printed on the second user side. Specifically, the acquisition unit 22 receives data indicating the print information from the user terminal 10 (that is, the second terminal 10B) of the second user who implements the printing. The print information includes an image ID of the printed image, information for specifying the second user who implements the printing (for example, an identification ID of the second terminal 10B), and the like.

The acquired print information is stored in the storage device 16D for each second user.

The method and timing of acquiring the print information are not particularly limited. For example, the data indicating the print information may be transmitted from the second terminal 10B whenever the transmitted image is printed on the second user side, and the acquisition unit 22 may receive the data whenever the data is transmitted. Alternatively, the print information may be accumulated in the second terminal 10B, the acquisition unit 22 may request the second terminal 10B to transmit the print information at a predetermined time, and the data of the print information transmitted in accordance with the request may be received.

Discrimination Unit

Based on the print information acquired for each second user, the discrimination unit 23 discriminates, for each second user, whether or not printing is implemented for each of the images received from the first user by each second user. The discrimination unit 23 specifies the number of times printing is implemented on the transmitted image that has been printed on the second user side for each second user. Here, whether or not printing is implemented and the number of times printing is implemented correspond to the implementation history of the printing. The number of times printing is implemented may correspond to a value related to an implementation frequency of printing, and may be the total number of times printing is implemented or may be the number of times printing is implemented within a certain period (for example, one year).

The implementation history of the printing of each transmitted image discriminated by the discrimination unit 23 is stored in the storage device 16D for each second user. Specifically, as shown in FIG. 7, the implementation history of the printing of each transmitted image is stored in association with a combination of an identification number (transmission ID) of the image transmission and a combination of the first user and the second user associated with each transmitted image.

Specifying Unit

The specifying unit 24 specifies a correspondence relationship between the feature of each transmitted image specified by the analysis unit 21 and the implementation history of the printing of each transmitted image specified by the discrimination unit 23 for each second user. At this time, the specifying unit 24 specifies the correspondence relationship in association with the first user who has transmitted the image (transmitted image) to the second user.

Specifically, the specifying unit 24 specifies the correspondence relationship between the feature of each transmitted image and the implementation history of the printing in association with the combination of the first user and the second user associated with each transmitted image. Here, the implementation history of the printing is specified based on the print information acquired by the acquisition unit 22 as described above. In terms of this point of view, it can be said that the specifying unit 24 specifies the correspondence relationship based on the print information.

The correspondence relationship specified for each transmitted image is stored in the storage device 16D for each second user in association with the first user who has transmitted each transmitted image.

Calculation Unit

The calculation unit 25 calculates the number of times the printing of the transmitted image is implemented for each second user based on the correspondence relationship specified for each second user by the specifying unit 24. More specifically, the calculation unit 25 calculates the number of times the printing of the transmitted image is implemented for each feature of the transmitted image for each second user. The calculated number of times the image printing is performed is stored in the storage device 16D for each second user and each feature.

FIG. 8 shows an example of the calculation result by the calculation unit 25. FIG. 8 shows the number of times the printing of the transmitted image is implemented by a certain second user (second user whose user ID is U0002B) for each feature. In the case shown in FIG. 8, the second user prints the transmitted image in which the type of the subject is "sea" 10 times and prints the transmitted image in which the type of the subject is "mountain" 8 times.

In order to calculate the number of times printing is implemented for each feature, the number of times printing is implemented is calculated for a combination of a plurality of types of subjects in addition to calculating the number of times printing is implemented for each type of subject as shown in FIG. 8. For example, the number of times printing is implemented may be calculated for an image in which the types of the subjects are "sea" and "cloud" (that is, an image in which the sea and the cloud appear).

Search Unit

The search unit 26 searches (specifies) the first image for each second user from among the images received by each second user. The first image is an image having a feature determined in accordance with the number of times of printing (that is, the magnitude of the value related to the frequency of printing), and is, for example, an image having the feature that has the largest number of times of printing. In the case shown in FIG. 8, the image in which the type of the subject is "sea" corresponds to the first image. The searched feature of the first image is stored in the storage device 16D for each second user.

The first image is not limited to the image having the feature that has the largest number of times of printing, and images having the feature that the number of times of printing is in the top 1 to nth (n is a natural number of 2 or more) may be used as the first image. The image having the feature that the number of times of printing is a predetermined number or more may be used as the first image. Alternatively, the image having the feature that has the largest number of times of printing in a predetermined period (for example, within the past several months to one year) may be used as the first image.

Extraction Unit

The extraction unit 27 extracts two or more second users having the feature of the first image in common, that is, the feature common group. Here, the fact that the feature is in common means that, for example, the features are the same. A procedure for extracting the feature common group will be described with reference to a specific example. For example, the number of times of printing calculated for each feature for each of the user B and the user C which are the second users is as shown in FIG. 9. As can be seen from FIG. 9, the user B and the user C most frequently print the image in which the type of the subject is "sea". In other words, the feature of the first image is in common between the user B and the user C. In this case, the extraction unit 27 extracts the user B and the user C as the feature common group.

The number of second users extracted as the feature common group is not particularly limited and may be at least two or more. The procedure for extracting the feature common group is not particularly limited. For example, the feature common group may be extracted by focusing on one second user (for example, a target user to be described below) and searching for another second user who has the same feature of the first image with another user in common.

In addition to the fact that the features are the same, the fact that the feature is in common may include a case where the features are similar. The fact that the features are similar means, for example, that the feature values approximate. Specifically, a feature value of each of two features to be compared may be defined in a feature value space, and a degree of similarity between the features may be evaluated based on a distance between the features in the space. In this case, the smaller the distance between the features, the more similar the features are (higher the degree of similarity).

In a case where the feature is the information on the type of the subject, the information may be quantified (specifically, vectorized) by a known method such as Word2vec, the quantified information may be defined in the vector space, and the degree of similarity between the features may be evaluated by a distance between vectors in the same space. In this case, the smaller the distance between the vectors, the more similar the information is.

Selection Unit

The selection unit 28 selects (specifies) the second image for the target user in a case where the target user is determined in the feature common group extracted by the extraction unit 27. The target user is a partner user in a case where the first user who uses the image recommendation from now on transmits the image, that is, a user who is a recipient of the second image, among the plurality of second users belonging to the feature common group. The second user other than the target user in the feature common group is hereinafter referred to as a non-target user. Incidentally, whether or not each second user of the feature common group corresponds to the target user or the non-target user in accordance with a transmission destination of the second image, that is, to whom the first user who uses the image recommendation sends the image.

The second image is an image that has a feature of an image that has not been transmitted to the target user (hereinafter, untransmitted image) and has the feature of the transmitted image that has been printed by the non-target user. The image specified as the second image may be an image having a relatively large number of times of printing among images (transmitted images) that are untransmitted images and have been printed by the non-target user. For example, among the images that are the untransmitted images and have been printed by the non-target user, an image having a second largest number of times of printing after the first image may be specified as the second image.

Taking the case shown in FIG. 9 as an example, for example, in a case where the user B is set as the target user and the user C is set as the non-target user, the selection unit 28 may specify, as the second image, an image in which the type of the subject is "mountain". In a case where the user C is set as the target user and the user B is set as the non-target user, the selection unit 28 may specify, as the second image, an image in which the type of the subject is "temple".

The method for selecting the second image is not particularly limited, and the second image may be selected from among the images that have been printed by the non-target user according to any criterion. For example, images in which the number of times of printing is in up to the top Nth (N is a natural number of 2 or more) may be selected as the second image. Among the images that have been printed by the non-target user, each image having the feature of the image that has not been transmitted to the target user may be selected as the second image.

In a case where a plurality of non-target users are present in the same feature common group, the second image may be selected from among the images printed by the non-target user for each non-target user.

Notification Unit

The notification unit 29 notifies (recommends) the first user who has transmitted the image (transmitted image) to the target user of the second image selected by the selection unit 28. Specifically, the notification unit 29 specifies the first user who has transmitted the image to the target user based on the implementation history of the printing (see FIG. 7) of each transmitted image. Hereinafter, the specified first user will be referred to as a "specific first user".

Subsequently, the notification unit 29 specifies image groups of the specific first user and specifies a feature for each of the specified image groups. The procedure for specifying the feature of each of the image groups of the specific first user is similar to the procedure for the analysis unit 21 to specify the feature of the transmitted image. The notification unit 29 determines whether or not there is the second image in the image group of the specific first user based on the feature of each of the specified image groups, and recommends the second image to the specific first user in a case where there is the second image.

For example, taking the case shown in FIG. 9 as an example, for example, the user B is the target user and the user A is the specific first user who has transmitted the image to the user B so far. In this case, in a case where an image (second image) in which the type of the subject is "mountain" is included in the image group of the user A, the notification unit 29 recommends, as the transmitted image to the user B, the image to the user A.

As described above, in the present embodiment, in order to determine whether or not the second image is included in the image group of the specific first user on the system side (server computer 16), the specific first user can omit time and effort of confirming whether or not there is the second image in the image group. The notification unit 29 may notify (recommend) of the specific first user of the second image selected by the selection unit 28 without determining whether or not the second image is included in the image group of the specific first user.

The method of the notification (recommendation) is not particularly limited. For example, data indicating information on the second image may be transmitted to the user terminal 10 of the specific first user, and the information may be displayed on the screen of the user terminal 10. Alternatively, the information may be output (reproduced) by voice on the user terminal 10.

In a case where the selection unit 28 specifies the plurality of second images, the notification unit 29 may preferentially notify (recommend) the specific first user of the second image having the feature that the large number of times of printing by the non-target user is larger among the plurality of second images. This is because, in a case where the image is an image having a large number of times of printing, it is presumed that a probability that the target user likes (satisfies) the image is high.

Information Processing Flow According to Embodiment of Present Invention

An information processing flow (hereinafter, image recommendation flow) by the information processing apparatus according to the embodiment of the present invention will be described. In the image recommendation flow, the information processing method according to the embodiment of the present invention is adopted. In other words, each step in the image recommendation flow corresponds to a component of the information processing method according to the embodiment of the present invention.

Hereinafter, in order to easily understand the description, a case where the first user is the user A, the second user is the users B and C, and the user A sends the image to the user B will be described as an example. The user A is the first user who has transmitted the image to the user B so far, that is, the specific first user.

Figure 10:
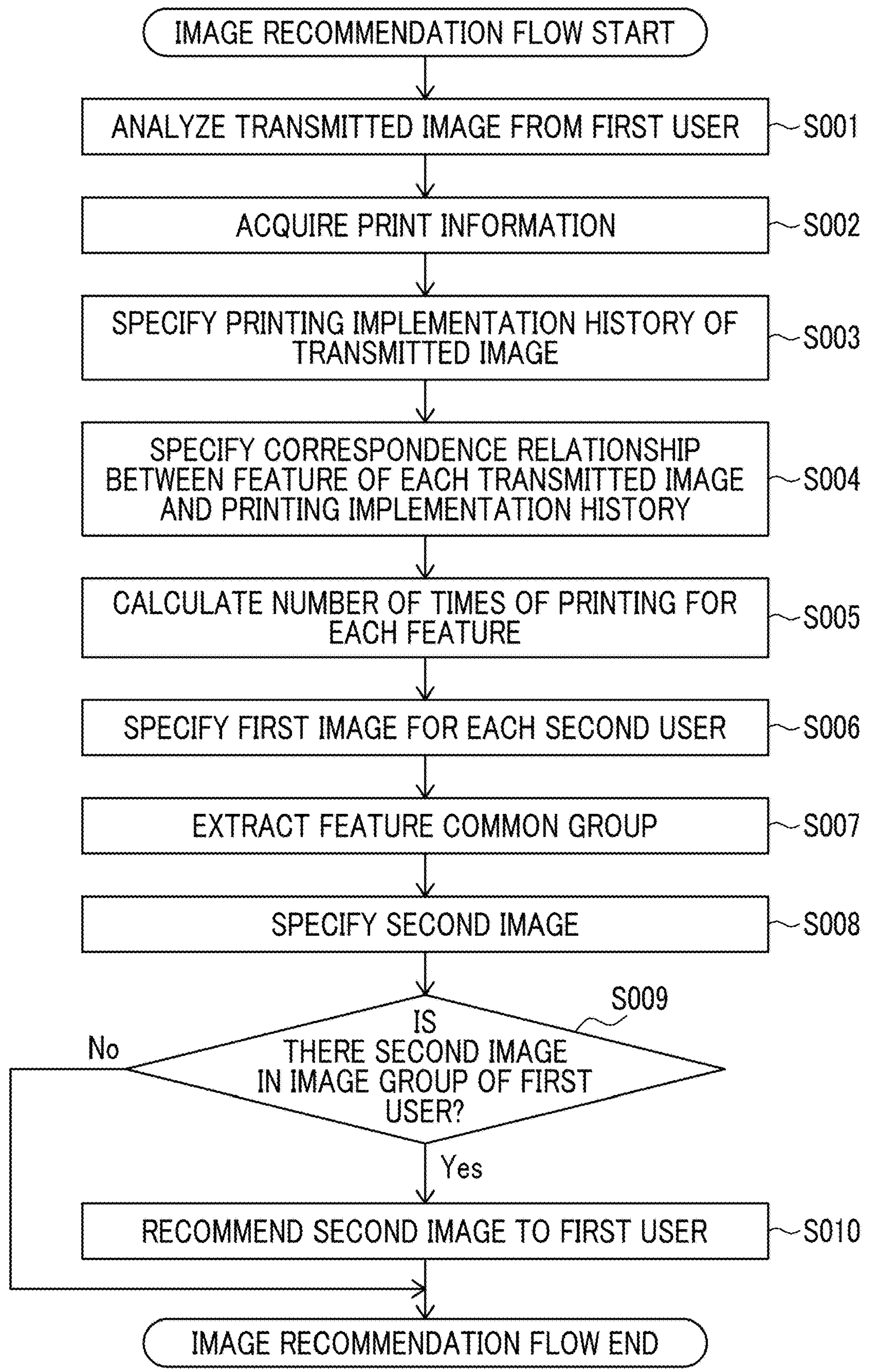
FIG. 10 is a diagram of an information processing flow according to the embodiment of the present invention.

The image recommendation flow is started, for example, in a case where the user A performs a predetermined operation on the user terminal 10. However, the present invention is not limited thereto, and the image recommendation flow may be periodically implemented at constant periods. The image recommendation flow proceeds in the flow shown in FIG. 10, and each step in the flow is executed by the processor 16A of the server computer 16 constituting the information processing apparatus.

In the image recommendation flow, first, the processor 16A analyzes each image (in other words, the transmitted image from the first user) received so far by each of the users B and C, and specifies the feature of each image (S001). The feature to be specified is the feature value of the subject in the transmitted image, the information on the type of the subject, the information on the imaging date and time of the transmitted image, the information on the imaging location of the transmitted image, or the combination thereof. Specifically, the processor 16A analyzes the region of the transmitted image in which there is the subject, and specifies the feature value of the subject and the information on the type of the subject. The processor 16A specifies the information on the type of the subject, the information on the imaging date and time of the transmitted image, and the information on the imaging location of the transmitted image based on the additional information added to the transmitted image.

The specified feature is stored in the storage device 16D in association with the identification ID (image ID) of the transmitted image having the feature (scc FIG. 6).

In the image recommendation flow, in a case where each of the user B and the user C prints the transmitted image, the processor 16A acquires the print information from the user terminal 10 of each of the user B and the user C (S002). The acquired print information is stored in the storage device 16D for each user (specifically, for each second user).

Thereafter, the processor 16A specifies, for each of the user B and the user C, whether or not the printing of the transmitted image is performed and the number of times of printing for each second user based on the print information acquired for each second user (S003). The implementation history of the printing of each transmitted image is stored in the storage device 16D in association with the transmission ID of each transmitted image and the combination of the first user and the second user associated with each transmitted image.

Subsequently, the processor 16A specifies, for each of the user B and the user C, the correspondence relationship between the feature of each transmitted image specified in step S001 and the implementation history of the printing of each transmitted image specified in step S003 (S004). At this time, the correspondence relationship is specified in association with the first user who has transmitted the image to the user B or the first user who has transmitted the image to the user C. The specified correspondence relationship is stored in the storage device 16D for each second user.

Subsequently, the processor 16A calculates, for each of the user B and the user C, the number of times the transmitted image is printed for each feature of the transmitted image based on the correspondence relationship specified in step S004 (S005). The number of times of image printing calculated for each of the user B and the user C is stored in the storage device 16D for each feature (see FIG. 8).

Subsequently, the processor 16A specifies the first image from among the images received by each of the user B and the user C for each user (each second user) based on the number of times of printing for each feature calculated in step S005 (S006). Specifically, among the transmitted images printed by each user, the image having the feature that the number of times of printing is the largest is specified as the first image. The feature of the first image specified for each of the user B and the user C is stored in the storage device 16D.

Subsequently, the processor 16A extracts two or more second users having the feature of the first image in common, that is, the feature common group (S007). Here, the feature of the first image specified for the user B and the feature of the first image specified for the user C are in common, and the user B and the user C are extracted as the feature common group. Hereinafter, in the feature common group, the user B is set as the target user, and the user C corresponds to the non-target user.

Subsequently, the processor 16A specifies the second image for the user B which is the target user (S008). Specifically, images having features of images that have not been transmitted to the user B (untransmitted images) are specified, and an image having the feature of the transmitted image that has been printed by the user C is selected as the second image from among the untransmitted images. In this step S008, for example, among the images that are the untransmitted images and have been printed by the user C, the image having the second largest number of times of printing after the first image is specified as the second image.

Thereafter, the processor 16A notifies (recommends) the user A who is the specific first user of the second image specified in step S008. Specifically, the processor 16A specifies the feature for each of the image groups of the user A, and determines whether or not there is the second image in the image group of the user A based on the feature of each of the specified image groups (S009). In a case where there is the second image in the image group of the user A, the second image is recommended to the user A (S010).

In a case where the plurality of second images are specified in step S008, the processor 16A implements steps S009 and S010 such that the second image having the feature that the number of times of printing is larger is preferentially notified (recommended).

The image recommendation flow is ended immediately before a timing of moment at which the series of steps so far is completed.

Other Embodiments

The embodiment described above is a specific example given to describe the information processing apparatus and the information processing method according to the embodiment of the present invention in an easy-to-understand manner, and is merely an example. Other embodiments can be considered.

In the above-described embodiment, although the recommended image (that is, the second image) is selected from the type of the subject such as "mountain" or "temple", the present invention is not limited thereto. For example, the second image may be selected based on the feature value of the subject (specifically, a feature value of human face).

The second image may be selected based on the imaging location or the imaging date and time of the image. In this case, for example, two second users who frequently print an image captured in the daytime on Sunday are extracted as the feature common group from the transmitted images from the first user. One of the users (non-target user) frequently prints the image captured at night on a weekday, and the other user (target user) has not received the image at night on a weekday so far. In this case, the image captured at night on a weekday may be recommended as a candidate for the transmitted image to the target user to the user (first user) who normally transmits the image to the target user.

In the above-described embodiment, for the second user, the number of times the transmitted image from the first user is printed is calculated for each feature of the transmitted image, and the first image is specified from among the transmitted images based on the calculation result. However, the present invention is not limited thereto, and as the number of times of printing, the number of times of printing the image of the first user is printed the first user may be added in addition to the number of times of printing the transmitted image from the first user is printed on the second user side. Here, the image printed by the first user is not necessarily transmitted to the second user. In view of this point, in a case where the number of times of printing by the first user is added to the number of times of printing, a weight smaller than a weight for the number of times of printing by the second user may be set for the number of times of printing by the first user.

In the above-described embodiment, although the function of the information processing apparatus according to the embodiment of the present invention is exhibited by the processor 16A provided in the server computer 16, the present invention is not limited thereto. The processor included in the information processing apparatus according to the embodiment of the present invention may be included in the user terminal 10 or the printer 12 on the user side. That is, a part or all of the above-described functional units provided in the information processing apparatus according to the embodiment of the present invention may be included in the user terminal 10 or the printer 12.

The processor included in the information processing apparatus according to the embodiment of the present invention includes various processors. The various processors include, for example, a CPU that is a general-purpose processor that functions as various processing units by executing software (program).

Various processors include a programmable logic device (PLD) which is a processor capable of changing a circuit configuration after manufacturer, such as a field programmable gate array (FPGA).

A dedicated electric circuit which is a processor having a circuit configuration specifically designed to perform specific processing such as an application specific integrated circuit (ASIC) is also included in the various processors.

One functional unit of the information processing apparatus according to the embodiment of the present invention may be constituted by one of the various processors, or may be constituted by a combination of two or more processors of the same type or different types, for example, a combination of a plurality of FPGAs or a combination of a CPU and an FPGA.

A plurality of functional units included in the information processing apparatus according to the embodiment of the present invention may be constituted by one of various processors, or may be constituted by one processor obtained by collectively using two or more of the plurality of functional units.

As in the above-described embodiment, one processor may be constituted by a combination of one or more CPUs and software, and the processor may function as a plurality of functional units.

For example, a processor that realizes the functions of the entire system including the plurality of functional units in the information processing apparatus according to the embodiment of the present invention as one integrated circuit (IC) chip is used so as to be represented by a system on chip (SoC). A hardware configuration of the various processors described above may be an electric circuitry (circuitry) in which circuit elements such as semiconductor elements are combined.

EXPLANATION OF REFERENCES

10: user terminal
10A: first terminal
10B: second terminal
12: printer
14: network
16: server computer
21: analysis unit
22: acquisition unit
23: discrimination unit
24: specifying unit
25: calculation unit
26: search unit
27: extraction unit
28: selection unit
29: notification unit
P: printed matter
S: image printing system

What is claimed is:

1. An information processing apparatus comprising a processor, wherein the processor is configured to:

specify a feature of transmitted images transmitted from a first user for each transmitted image;

specify a correspondence relationship between the feature and a history regarding printing of the transmitted image on a second user side who receives the transmitted image for each second user;

calculate a value related to an implementation frequency of the printing of the transmitted image for each second user and for each feature based on the correspondence relationship specified for each second user;

specify a high frequency feature determined depending on a magnitude of the value among the features for each second user;

extract two or more second users who have the high frequency feature in common; and specify the high frequency feature of a non-target user other than the target user among the extracted two or more second users as a first feature for the target user.

2. The information processing apparatus according to claim 1, wherein the processor is configured to specify the feature for each of image groups that are able to be transmitted by the first user that has transmitted the transmitted image to the target user, and specify the first feature from the specified features.

3. The information processing apparatus according to claim 1, wherein the processor is configured to specify, as the feature, at least one of a feature value of a subject in the transmitted image, information on a type of the subject, information on an imaging date and time of the transmitted image, or information on an imaging location of the transmitted image.

4. The information processing apparatus according to claim 3, wherein the processor is configured to specify the feature by analyzing a region of the transmitted image in which there is the subject.

5. The information processing apparatus according to claim 3, wherein the processor is configured to specify the feature based on additional information added to the transmitted image.

6. The information processing apparatus according to claim 1, wherein the processor is configured to specify the correspondence relationship in association with the first user that has transmitted the transmitted image to the second user.

7. The information processing apparatus according to claim 1, wherein the processor is configured to specify the high frequency feature in which the value is largest among the features for each second user.

8. The information processing apparatus according to claim 1, wherein, in a case where the transmitted image is printed on the second user side, the processor is configured to acquire print information on the printed transmitted image and specify the correspondence relationship based on the print information.

9. The information processing apparatus according to claim 1, wherein the first feature is the feature obtained by excluding the high frequency feature of the target user from the high frequency feature of the non-target user.

10. The information processing apparatus according to claim 1, wherein the processor is configured to extract the first user who has acquired an image having the first feature and notify the extracted first user of the image having the first feature.

11. The information processing apparatus according to claim 10, the first user is a user who has transmitted the transmitted image to the target user.

12. The information processing apparatus according to claim 10, wherein the processor is configured to preferentially notify of the image having the first feature that the number of times of printing by the non-target user is larger among a plurality of the first features in a case where the plurality of the first features are specified.

13. An information processing method, the method comprising:

by a processor, specifying a feature of transmitted images transmitted from a first user for each transmitted image;

specifying a correspondence relationship between the feature and a history regarding printing of the transmitted image on a second user side who receives the transmitted image for each second user;

calculating a value related to an implementation frequency of the printing of the transmitted image for each second user and for each feature based on the correspondence relationship specified for each second user;

specifying a high frequency feature determined depending on a magnitude of the value among the features for each second user;

extracting two or more second users who have the high frequency feature in common; and specifying the high frequency feature a non-target user other than the target user among the extracted two or more second users as a first feature for the target user.

14. The information processing method according to claim 13, further comprising:

specifying, by the processor, the feature for each of image groups that are able to be transmitted by the first user that has transmitted the transmitted image to the target user, and specifying the first feature from the specified features.

15. A non-transitory recording medium readable by a computer and having a program recorded thereon causing a computer to execute each step included in the information processing method according to claim 14.

16. The information processing method according to claim 13, further comprising:

specifying, by the processor, the correspondence relationship in association with the first user that has transmitted the transmitted image to the second user.

17. A non-transitory recording medium readable by a computer and having a program recorded thereon causing a computer to execute each step included in the information processing method according to claim 16.

18. The information processing method according to claim 13, further comprising:

acquiring, by the processor, print information on the printed transmitted image, and specify the correspondence relationship based on the print information in a case where the transmitted image is printed on the second user side.

19. A non-transitory recording medium readable by a computer and having a program recorded thereon causing a computer to execute each step included in the information processing method according to claim 18.

20. A non-transitory recording medium readable by a computer and having a program recorded thereon causing a computer to execute each step included in the information processing method according to claim 13.

21. The information processing method according to claim 13, further comprising:

extracting, by the processor, the first user who has acquired an image having the first feature, and notifying the extracted first user of the image having the first feature.

22. The information processing method according to claim 21, further comprising:

preferentially notifying, by the processor, the image having the first feature that the number of times of printing by the non-target user is larger among a plurality of the first features in a case where the plurality of the first features are specified.

23. A non-transitory recording medium readable by a computer and having a program recorded thereon causing a computer to execute each step included in the information processing method according to claim 22.

* * * * *